J. HEMINGTON.
FEEDING SAWDUST TO FURNACES, &c.
No. 17,039. Patented Apr. 14, 1857
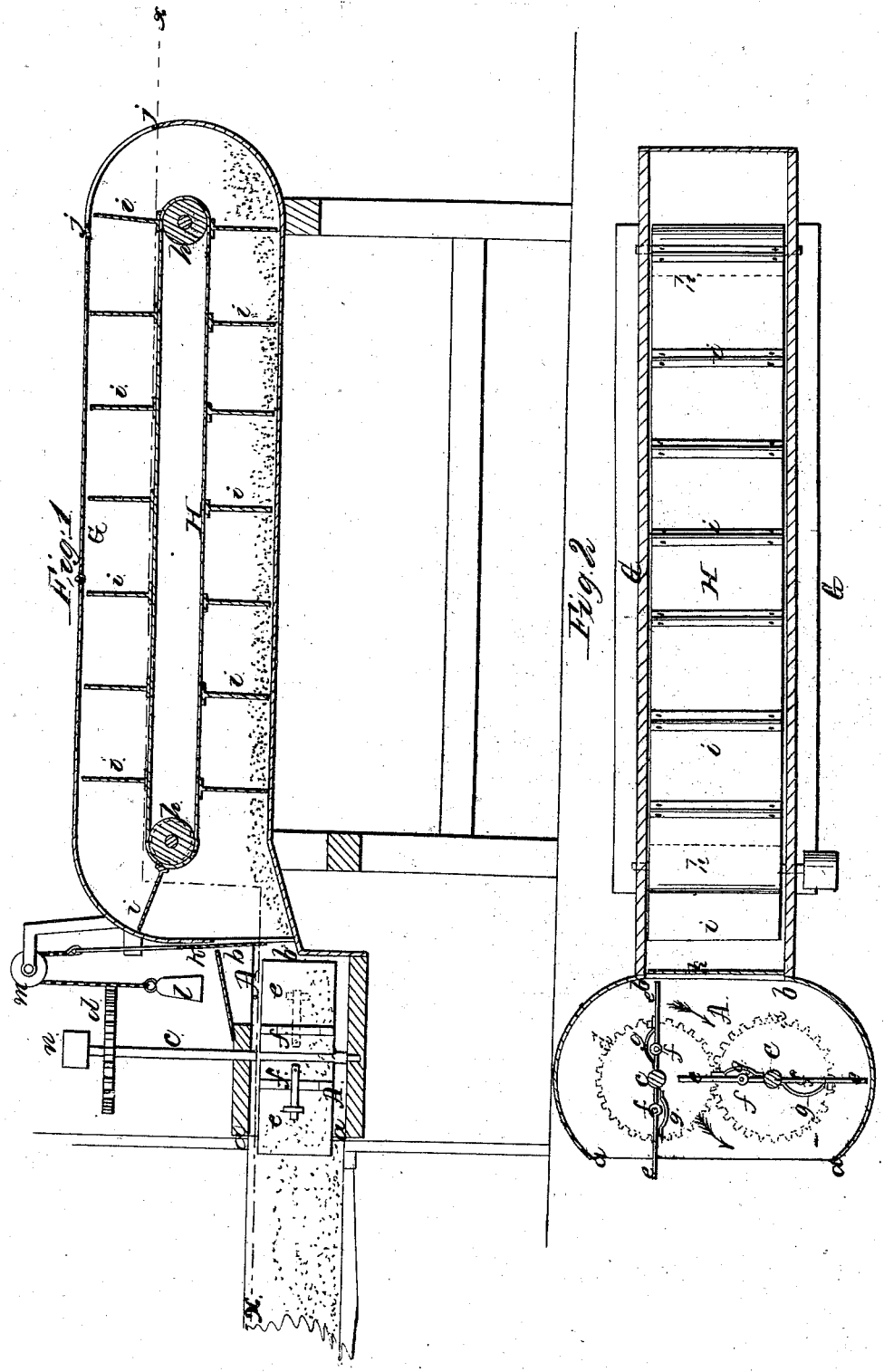

UNITED STATES PATENT OFFICE.

JAS. HEMINGTON, OF RICHMOND, INDIANA.

APPARATUS FOR FEEDING FUEL TO FURNACES.

Specification of Letters Patent No. 17,039, dated April 14, 1857.

*To all whom it may concern:*

Be it known that I, JAMES HEMINGTON, of Richmond, in the county of Wayne and State of Indiana, have invented a new and useful Apparatus for Feeding Sawdust or other Light Fuel to Steam-Boiler and other Furnaces; and I do hereby declare that the following is a full, clear, and exact description of the same, reference being had to the accompanying drawings, forming part of this specification, in which—

Figure 1 is a longitudinal vertical section of the apparatus and Fig. 2, a horizontal section of the same, in the line $x, x,$ of Fig. 1.

Similar letters of reference indicate corresponding parts in both figures.

The object of this invention is to give a continual supply of saw-dust and other light fuel of a similar nature to furnaces in such quantity as may be required, without admitting more cold air to the furnaces than is desirable.

To enable those skilled in the art to make and use my invention, I will proceed to describe its construction and operation.

A is an iron box which is closed at the top, bottom and sides, but which has an opening $a, a,$ in front, and another $b, b,$ in the rear. The front of this box fits close up to the mouths of the furnace to be supplied so as to exclude all air therefrom except what may pass through the opening $a, a;$ and the bottom of the box is at a convenient distance above the bottom or grate of the furnace.

$c, c,$ are two upright shafts arranged, side by side and working in suitable bearings in the top and bottom of the box, and carrying each, within the box, two wings or blades $e, e,$ which are of such depth as to reach nearly from bottom to top of the box and of such width that those on one shaft will just rotate clear of the other shaft. These wings or blades are so arranged upon their respective shafts that when both shafts rotate at the same speed in opposite directions, those wings or blades on one shaft will work midway between those on the other. The two shafts are geared together by gears $d, d,$ above the box and caused to rotate in opposite directions; their directions, which are indicated by arrows in Fig. 2, being respectively such that as the wings or blades move toward the center of the box, they will also move toward the opening $a, a.$ The wings or blades which constitute feeders to feed the saw-dust or other material from the box A, into the furnace, are made with joints $f, f,$ at or near where they connect with their respective shafts; but springs $g, g,$ are applied behind them in such a manner as to hold them generally in a radial position or nearly so relatively to the shaft, but to allow them to bend or swing back to some extent in case of their meeting with obstruction from chips or other particles of matter of more than ordinary size, to allow them to clear such particles and thus prevent them being broken thereby. The springs cause them to resume their proper operative position after clearing the obstruction.

G, is a long horizontal trunk placed behind the box A, and communicating therewith through the opening $b, b.$ This tank contains an endless apron H or system of endless belts arranged upon horizontal rollers $h, h,$ near its ends, and carrying a series of blades or scrapers $i, i,$ and at the end farthest from the box A, the said trunk has an opening $j, j,$ through which the sawdust or other material is supplied to it through a hopper or by any suitable means. At the opening of communication $b, b,$ between the trunk G, and box A, there is placed a sliding shutter $k,$ of damper like form whose position is controlled by a weight $l,$ attached to a cord or chain passing over a pulley $m.$ Motion being communicated in a continuous manner to the shafts $c, c,$ by a belt running around a pulley $n,$ on one shaft or by other suitable means, and also by suitable means to the apron H or system of endless belts in such a direction that the lower blades or scrapers $i, i,$ move toward the opening $b, b,$ the saw dust or other material supplied to the trunk G, at $j, j,$ is moved continuously along the bottom of the trunk toward the opening $b, b,$ and supplied through the said opening to the box, A, from whence it is fed continuously by the revolution of the feeders $e, e,$ into the furnace without the admission of any considerable quantity of cold air to damp the fire as is the case in feeding the fuel from time to time through an open door. The supply is regulated by opening the shutter $k,$ more or less.

This apparatus not only supplies the fuel to the fire continuously but distributes it evenly, and by its use the danger of fire is much lessened.

I do not confine myself to the employment of a trunk H, containing a series of moving blades or scrapers $i$, $i$, to supply the box A, as any other suitable means of keeping it properly supplied may be used; nor do I confine myself to the use of any particular number of feeders $e$, $e$, upon each shaft. But

What I claim as my invention, and desire to secure by Letters Patent, is:

Attaching the feeders $e$, $e$, to their shafts by joints $f$, $f$, and applying springs $g$, $g$, thereto, substantially as and for the purpose herein set forth.

JAMES HEMINGTON.

Witnesses:
  THOMAS NEWLY,
  JOHN FINLEY.